Patented Aug. 18, 1936

2,051,768

UNITED STATES PATENT OFFICE 2,051,768

COMPOSITIONS OF MATTER AND METHODS AND STEPS OF MAKING AND USING THE SAME

Mortimer T. Harvey, East Orange, N. J., assignor to The Harvel Corporation, a corporation of New Jersey No Drawing. Application October 22, 1935, Serial No. 46,167

8 Claims. (Cl. 260—2)

The present invention relates to oil soluble, fusible resinous condensations made from tertiary hydrocarbon ethers of substituted phenols and agents containing reactive methylene groups in the absence of water and under conditions which give a pH value greater than 7, and to methods and steps for obtaining such resinous condensations.

I have discovered that tertiary hydrocarbon ethers of substituted phenols having at least one of the readily reactive positions unsubstituted with the aid of heat will react with the methylene radicle under conditions to give a pH value of over 7 to give condensation products which at normal temperatures are hard and brittle but which are fusible by heat and are soluble in drying oils and semi-drying oils such as linseed oil, China-wood oil, perilla oil, soya bean oil and so on.

According to German Patent 406,152 strong organic acids are required to bring about the condensation of formaldehyde with phenolic ethers such as the methyl ether of phenol and the ethyl ether of cresol. And according to Hill, U. S. Patent 2,003,291 acid mediums are necessary to condense formaldehyde with ethers of 1·3·5 xylenol. It is known that formaldehyde will not condense with the methyl ether of phenol or of cresol in the presence of ammonia.

By readily reactive position of the phenol nucleus is meant the ortho and the para positions.

By the term "oil soluble" is meant soluble in drying and semi-drying oils such as linseed oil, China-wood oil, perilla oil and soya bean oil.

By the "fusible resin" is meant a resin which after continued heating at about 105° C. for twenty-four hours is still soft at that temperature.

By "reactive methylene group containing agents" is meant such materials as formaldehyde, paraformaldehyde, ethyl aldehyde, paraldehyde, furfuraldehyde, benzaldehyde, butyl aldehyde, hexamethylene tetramine and their equivalents.

An object of the present invention is to provide an economical method of making a light colored, oil soluble and infusible resinous condensation of a methylene group with the tertiary ethers of substituted phenols, the method comprising bringing about the reaction in the absence of water and under conditions which will give a pH value of more than 7.

Another object of the present invention is to provide a method of utilizing mixtures of plural substituted phenols and the corresponding ethers of substituted phenols in the making of resinous condensations without the cost of changing the ethers into the plural substituted phenols.

Other objects and advantages of the present invention will appear from the present disclosure and the appended claims forming part hereof.

Illustrative examples of the methods and products of the present invention are as follows:

*Example I.*—Substantially molecular parts of tertiary butyl ether of 1·4·2 xylenol and hexamethylene tetramine are heated together at about 170° C. for about one and one-half hours to the desired body.

*Example II.*—Substantially molecular proportions of hexamethylene tetramine and a mixture of tertiary butyl ethers of ortho, meta and para cresols and 1·4·2 xylenol (containing about 50% of the xylenol ether, 10% ethers of the cresols and the rest the corresponding trisubstituted phenols which result from the conversion of these ethers) are heated together for about one and one-half hours to a desired body.

*Example III.*—About one hundred parts by weight of a mixture of tertiary butyl ethers of phenol, o-cresol and meta para cresol and twenty-five parts of hexamethylene tetramine are heated together at about 170° C. until a cooled sample will become hard and brittle. This can be done in about one hour and a half and the resin is oil soluble and fusible.

*Example IV.*—A given weight of a mixture comprising about eighty per cent tertiary butyl ether of ortho cresol and twenty per cent para tertiary butyl ortho methyl phenol are heated for about one and one-half hours together with a molecular proportion of a mixture comprising about seven parts of paraformaldehyde and three parts of hexamethylene tetramine (a molecular proportion of methylene radicle for each of the ether and the phenol), until the condensation reaction product reaches desired consistency.

In the above examples a desirable consistency can be to a hard, brittle button when cold and the temperature of heating to acquire it can be about 150° to 170° C., for example.

While I have recited only tertiary butyl ethers in the examples other tertiary hydrocarbon ethers can be used, for example, in each of the above examples a corresponding amount of the corresponding tertiary amyl phenol ethers can be used.

In carrying out the methods of the present invention it is to be understood that the ethers disclosed can be used together with phenols, for example those phenols which result from the transformation of the hydrocarbon group from the ether position to a substituted position on the phenol nucleus. For example, when the tertiary butyl ether of 1·4·2 xylenol is used a corresponding trisubstituted phenol may be present, and this trisubstituted phenol may be 2-methyl 3-tertiary butyl 4-methyl phenol. Likewise when tertiary butyl ether of ortho cresol is used ortho methyl para tertiary butyl phenol may be present. Also phenol ($C_6H_5OH$) can be present. In these cases the phenols will condense with the methylene group to form part of the resinous condensation and the resulting resinous condensates are oil soluble and fusible.

The advantage of carrying the reaction on in the substantial absence of water is that higher temperatures can be used immediately with the result that the reaction product can be quickly obtained, and this advantage is obtainable with paraformaldehyde if it is added only so fast as it goes into reaction. Also, paraformaldehyde can be used in small proportions with hexamethylene tetramine, the latter serving also to give the pH value condition of over 7, in which case the entire quantity used of these two materials can be in the reaction mixture from the beginning of the heating. In those cases where the larger proportion or the entire quantity of methylene group containing material is paraformaldehyde (and in which case it is added slowly) the material for giving the proper pH value condition can be hexamethylene tetramine, triethylamine, triethanolamine, aniline, or metallic or ammonia soaps such as sodium oleate, sodium stearate, ammonium oleate and so on, or it can be a material such as ammonium carbonate. By the terms "absence of water" or "substantial absence of water" is meant conditions under which the condensation reaction can be carried on at temperatures above ordinary refluxing temperatures, that is above 100° C., to obtain the advantages of making the condensate quickly. For example, under the conditions of the present invention the desired degree of reaction can be reached in from one to two hours whereas with condensation under refluxing condition six to eight hours or more are necessary to get the desired results. Also, the reaction can be carried on at temperatures as high as the boiling point of the lowest boiling point ingredient, for example, as high as the boiling point of the lightest ether present.

The resins made by the method of the present invention, particularly those made with hexamethylene tetramine, are more fluid at 105° C. and have sharper and higher melting points than are those made of the same ethers by refluxing with formaldehyde solution under acid conditions.

Having thus described my invention, what I claim and desire to protect by Letters Patent is:

1. The method of making oil soluble, fusible resinous condensations which comprises reacting tertiary hydrocarbon ethers of hydrocarbon substituted phenols, having at least one readily reactive position unsubstituted, and a reactive methylene containing agent, under conditions which will give a pH value of more than 7, and in a temperature range from 120° C. to a point below the boiling of the ethers used.

2. The method of making light colored, oil soluble, fusible resinous condensates which comprises reacting tertiary hydrocarbon ethers of substituted phenols, having at least one readily reactive position unsubstituted, and a reactive methylene containing agent under the influence of ammonia or a substituted ammonia and in substantial absence of water.

3. The method of making light colored, oil soluble, fusible resinous condensates which comprises reacting tertiary hydrocarbon ethers of hydrocarbon substituted phenols, having at least one readily reactive position unsubstituted and hexamethylene tetramine.

4. The method of making oil soluble, fusible resinous condensates which comprises reacting tertiary hydrocarbon ethers of hydrocarbon substituted phenols, having at least one readily reactive position unsubstituted, with hexamethylene tetramine at a temperature above 120° C. and below the boiling point of the ethers used.

5. The method of making oil soluble fusible resinous condensates which comprises reacting hexamethylene tetramine with material selected from the group consisting of the tertiary butyl and tertiary amyl ethers of the cresols and xylenols.

6. The method of making oil soluble, fusible resinous condensates which comprises reacting hexamethylene tetramine with material selected from the group consisting of the tertiary butyl and tertiary amyl ethers of 1·4·2 xylenol.

7. The method of making oil soluble, fusible resinous condensates which comprises reacting a mixture of paraformaldehyde and hexamethylene tetramine with material selected from the group consisting of the tertiary butyl and tertiary amyl ethers of the cresols and xylenols.

8. The method of making oil soluble, fusible resinous condensates which comprises reacting a mixture of paraformaldehyde and hexamethylene tetramine with material selected from the group consisting of the tertiary butyl and tertiary amyl ethers of 1·4·2 xylenol.

MORTIMER T. HARVEY.